March 14, 1961

G. L. VAUGHAN ET AL

2,974,773

SPRING PIN WOODS FEEDER

Filed July 14, 1958

March 14, 1961  G. L. VAUGHAN ET AL  2,974,773
SPRING PIN WOODS FEEDER
Filed July 14, 1958  12 Sheets-Sheet 5

Fig. 5.

INVENTORS
Gerald L. Vaughan
Bernard M. Drury.
BY Karl W. Flocks
ATTORNEY

Fig. 9.

INVENTORS
Gerald L. Vaughan
Bernard M. Drury
BY Karl W. Flocks
ATTORNEY

Fig. 12.

INVENTORS
Gerald L. Vaughan
Bernard M. Drury.

BY Karl W. Flocks
ATTORNEY

United States Patent Office 2,974,773
Patented Mar. 14, 1961

2,974,773
SPRING PIN WOODS FEEDER

Gerald L. Vaughan and Bernard M. Drury, Dixfield, Maine, assignors to Diamond National Corporation, a corporation of Delaware Filed July 14, 1958, Ser. No. 748,392

6 Claims. (Cl. 198—33)

This invention relates to an apparatus for use in manufacturing spring-type clothespins, and more particularly to an apparatus for orienting the wood members of spring-type clothespins in a predetermined manner preparatory to their final assembly into clothespin form.

The wood stick members used in manufacturing spring-type clothespins are received from the woodworking apparatus which forms them in randomly-oriented arrangement. In order for the pins to be properly arranged for the final assembly operation in which pairs of pins are joined together by a spring member to form the completed spring-type clothespin, the individual wood members must all be arranged parallel to each other with the same side of the wood members facing upwardly and with corresponding ends of the wood members all pointing in the same direction. However, when the wood members are received from the woodworking apparatus on which they are formed, none of the requirements just stated are satisfied; that is, the plurality of pins are in a non-parallel orientation, and have their sides and ends randomly oriented.

Accordingly, it is an object of this invention to provide an apparatus for properly orienting the wood members used in spring-type clothespins preparatory to their assembly into clothespin form.

It is another object of this invention to provide an apparatus for arranging randomly-oriented wood members used in spring-type clothespins so that the wood members are arranged parallel to each other, with the same side or face directed upwardly and with corresponding ends of all the wood members pointing in the same direction.

It is another object of this invention to provide an apparatus which expedites and makes more economical the manufacture of spring-type wooden clothespins.

In accordance with an embodiment of the invention, a spring pin woods feeder and orienting apparatus is provided which includes a hopper member into which the woods members are discharged by chutes which arrange the woods members in parallel relation to each other as they are fed into the hopper, the woods remaining randomly oriented with respect to their sides and ends. The wood members are discharged by the hopper into the pocketed flight of a main conveyor which carries the woods past a spring-biased roller member which partially rotates wood members having a wrong side orientation, and then past an arm member which completes the rotation of the partially turned wood members to thereby cause the wood members to have proper side orientation.

The main conveyor then carries the wood members past a sensing means which detects wood members having wrong end orientation and energizes an ejecting plunger which ejects the wrong-end-oriented wood members into the pockets of an auxiliary conveyor moving in side-by-side relation to the main conveyor in synchronized relation therewith. The auxiliary conveyor includes pivoted flight members which are guided by cam tracks to cause the flight members to move from a horizontal to slightly beyond a vertical position in which the wrong-end-oriented wood members carried by the auxiliary conveyor flights are "flipped" back into the pockets of the main conveyor in which they were originally positioned and with proper end orientation.

In accordance with another embodiment of the invention, a modified end orientation apparatus is provided and includes an auxiliary conveyor moving at right angles to the path of the main conveyor. Spring-biased pin members are carried by the auxiliary conveyor and cooperate with a stationary cam track in such manner as to engage wrong-end-oriented wood members, carry them through a path of 180 degrees, and deposit each wood member back into the same flight of the main conveyor as that in which it was originally positioned and with proper end orientation.

Further objects and advantages of the invention will become apparent from the following description taken in conjunction with the accompanying drawings in which—

Referring now to the drawings, and more particularly to Figs. 1–12, inclusive, the spring pin woods feeder and orienting machine comprises a hopper generally indicated at 10 to which the randomly-oriented woods members are delivered from a suitable supply source. The wood members are delivered to the open upper end of hopper 10 by a plurality of inclined converging chute members 12 which serve to orient the woods members in parallel relation to each other as they enter the upper end of the hopper. The woods members are delivered from the lower end of hopper 10 to a main conveyor member generally indicated at 20. Conveyor 20 includes a plurality of flights 22, each flight 22 including a pocket 24 of semi-circular cross section for receiving one of the wood members.

In order to keep the wood members in a fluid condition adjacent the discharge end of hopper 10 and to further assist in feeding them in parallel relation to pockets 24 of conveyor 20, a roller member 26 positioned at the discharge end of the hopper is rotatably driven by a motor 28 (Fig. 5) connected through a V-belt drive member 30 to the shaft on which roller member 26 is mounted. Roller 26 rotates in a clockwise direction viewed from the front of the apparatus about an axis of rotation outside of and forwardly of the lower end of inclined wall 32 of the hopper is substantially tangent to the periphery of the roller.

The rearward wall 34 of hopper 10 terminates at its lower portion in a flexible rearwardly curved arcuate wall portion 36. Means are provided for imparting a vibrating oscillatory movement to arcuate wall portion 36 and rearward wall 34 to thereby impart a vibratory movement to wood members located in the lower portion of hopper 10, as a further aid in maintaining the wood members in a fluid condition to insure against jamming of the wood members. The mechanism for vibrating wall portion 36 and rearward wall 34 includes an arm member 38 having one end pivotally connected at 40 to a bracket 42 integral with the outer surface of wall portion 36. The opposite end of arm member 38 serves as a bearing for a rotating eccentric 44 driven by a drive means to be hereinafter described.

Main conveyor 20 passes around drive sprockets 46 mounted on a shaft 48 adjacent one end of the apparatus and around idler sprockets 50 mounted on a shaft 52 adjacent the opposite end of the apparatus. An auxiliary conveyor generally indicated at 54 which is used in connection with the end orientation of the wood members, as will be hereinafter more fully explained, extends in parallel side-by-side relation to main conveyor 20 intermediate the length of conveyor 20. Auxiliary conveyor 54 passes around drive sprockets 56 mounted on a shaft 58 at one end of the auxiliary conveyor and around idler sprockets 60 mounted on a shaft 62 at the opposite end of the auxiliary conveyor.

Both the main conveyor 20 and the auxiliary conveyor 54 are driven in synchronous relation to each other by a drive motor 64 connected by a drive belt 65 to variable speed transmission device 66 which includes a suitable clutching means to permit interruption of the movement of conveyors 20 and 54 as desired. Variable speed transmission 66 has an output sprocket 68 which drives a chain member 70 which, in turn, passes around sprockets 72 and 74 which are respectively attached to drive shaft 48 of main conveyor 20 and to drive shaft 58 of auxiliary conveyor 54.

Figure 5:
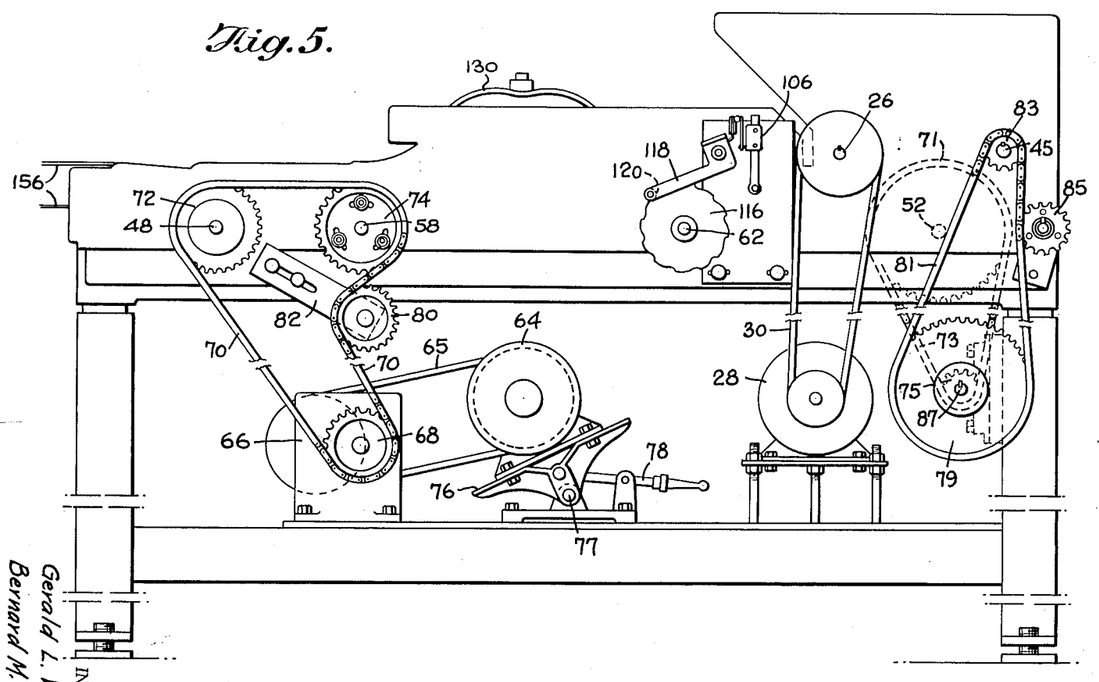
Fig. 5 is a rear elevation view of the machine of Fig. 1.
Figure 6:
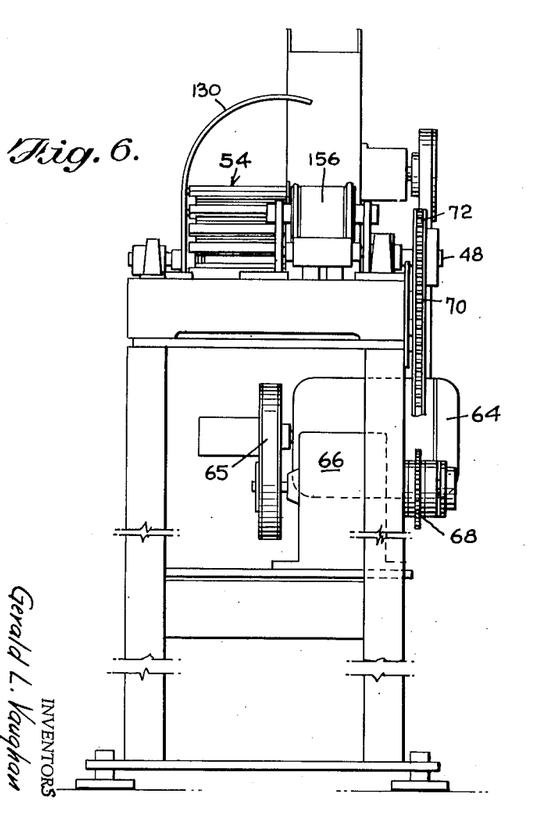
Fig. 6 is a right-hand end view of the machine with emphasis on the driving mechanism.
Figure 7:
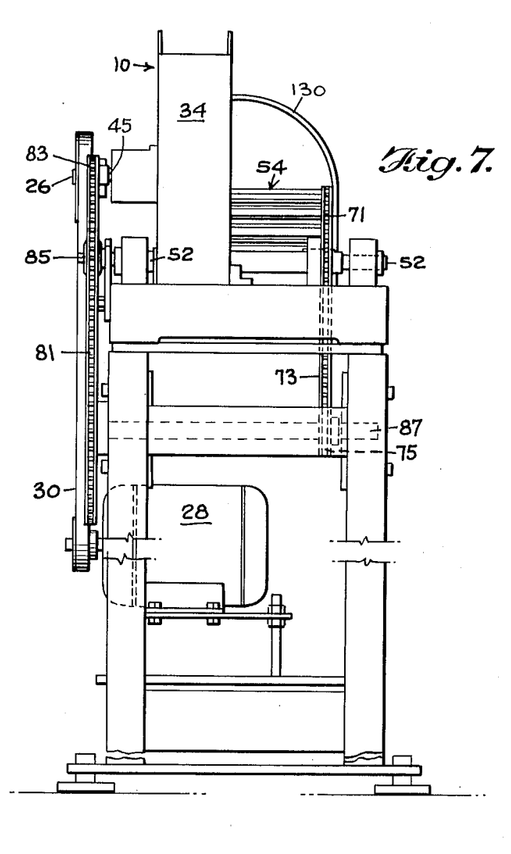
Fig. 7 is a left-hand end view of the machine with emphasis on the driving mechanism.
Figure 9:
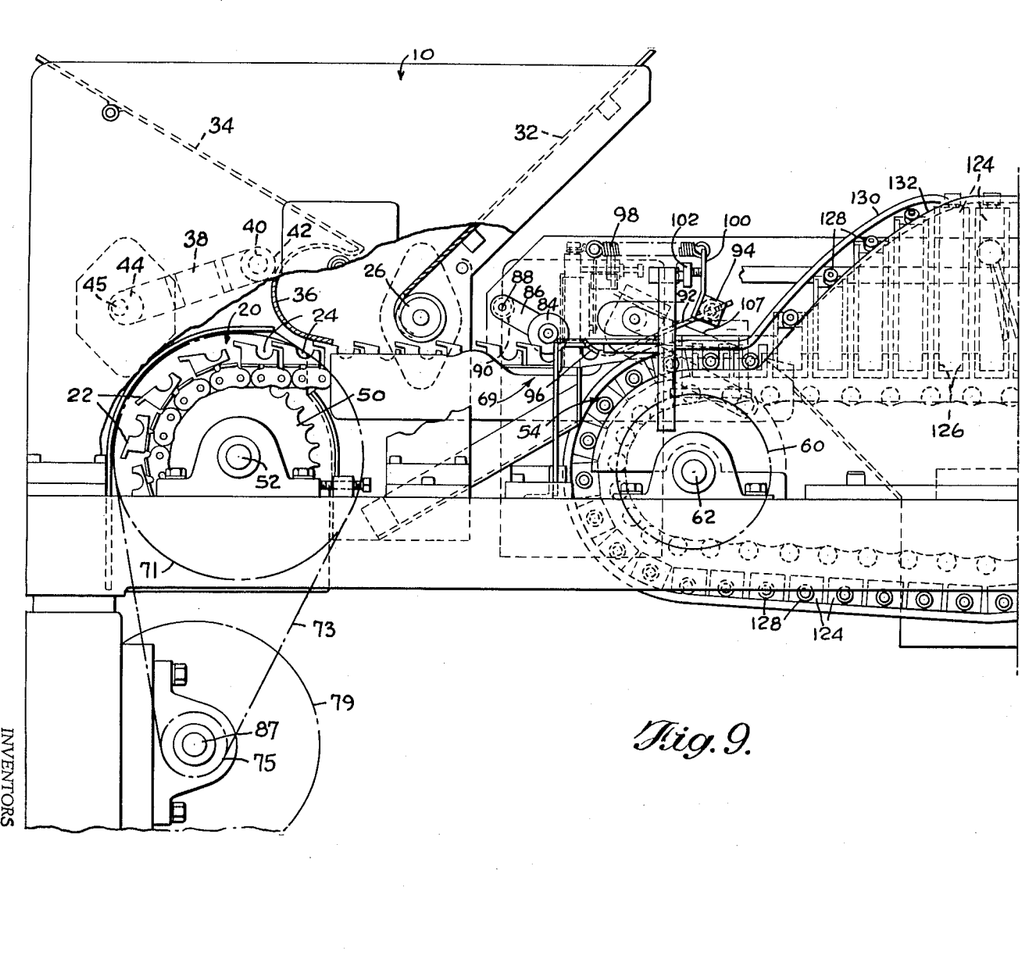
Fig. 9 and Fig. 10 are enlarged views of the left portion and right portion, respectively, of the machine as illustrated in Fig. 1.
Figure 10:
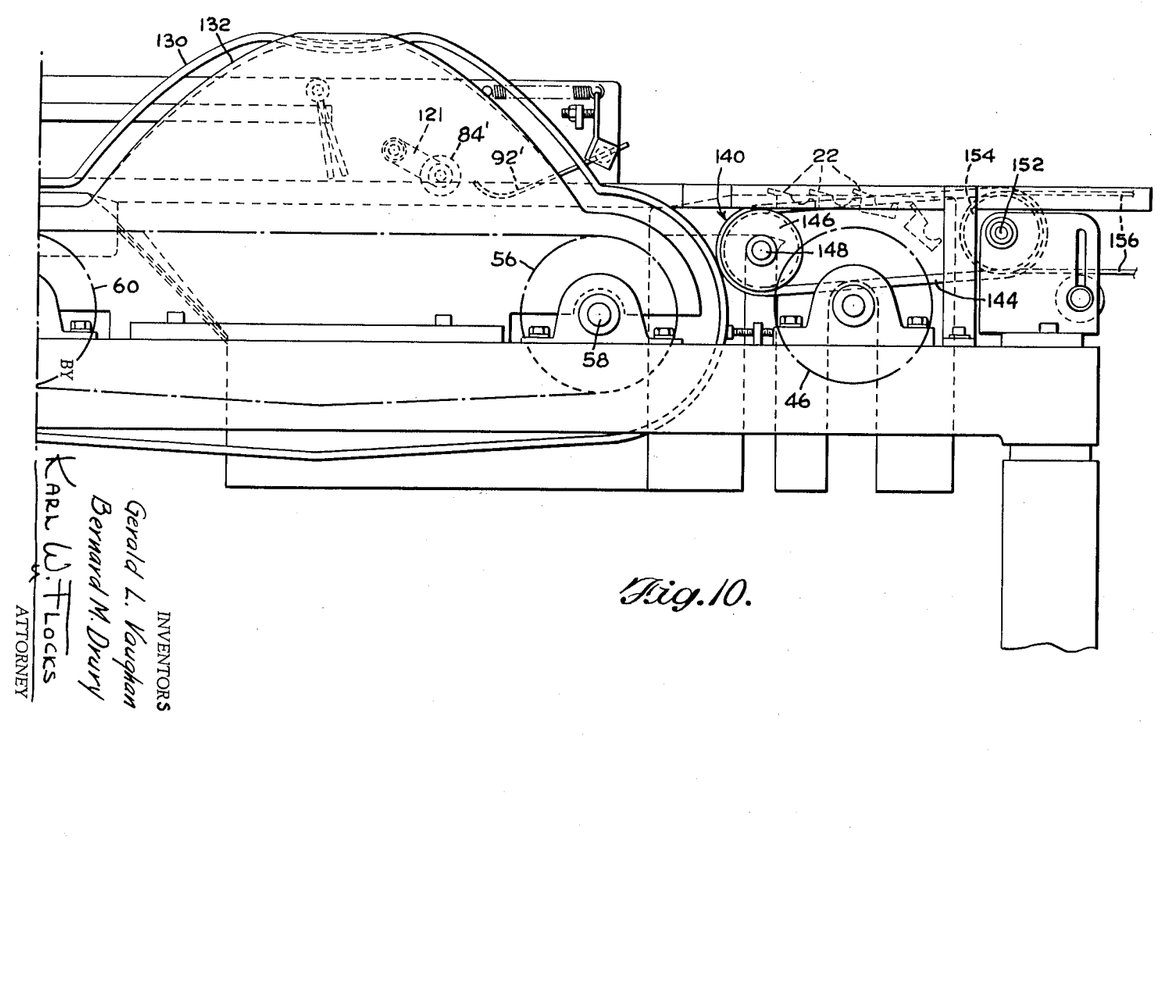
Figure 11:
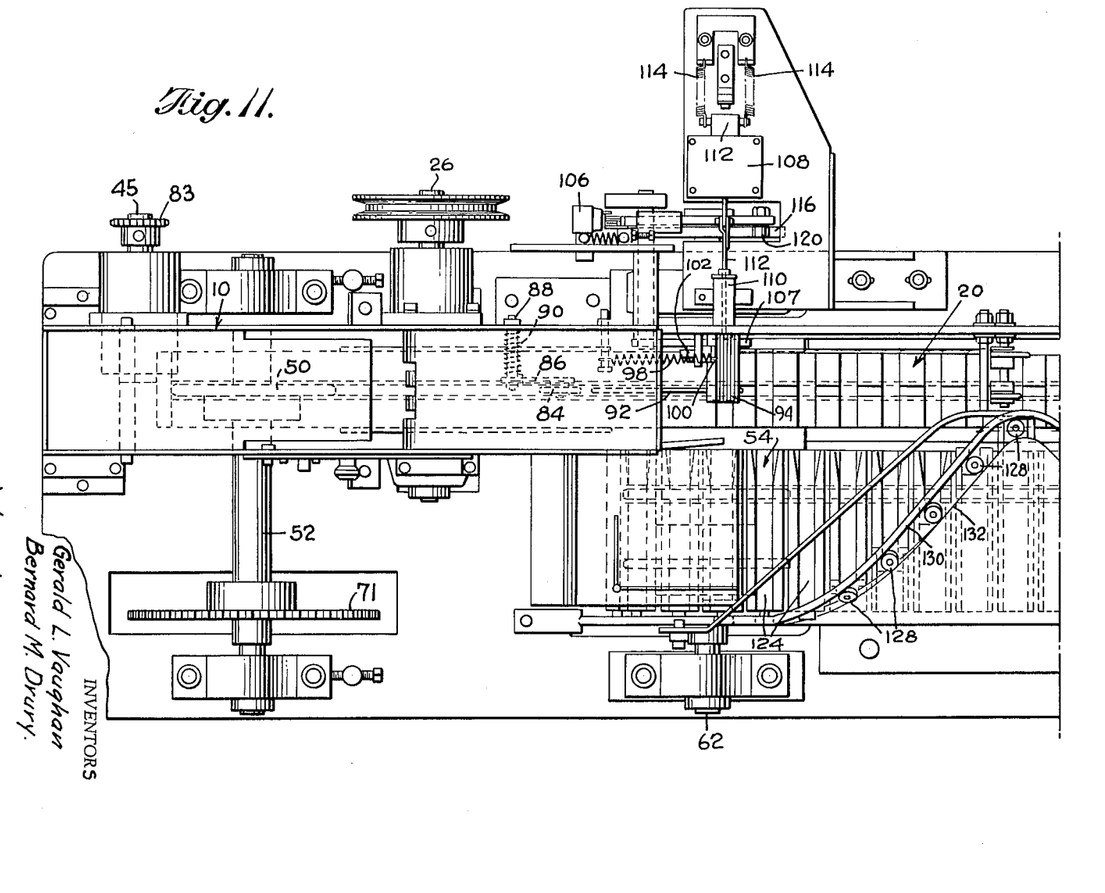
Figs. 11 and 12 are enlarged views of the left portion and right portion, respectively, of the machine as illustrated in Fig. 2.
Figure 12:
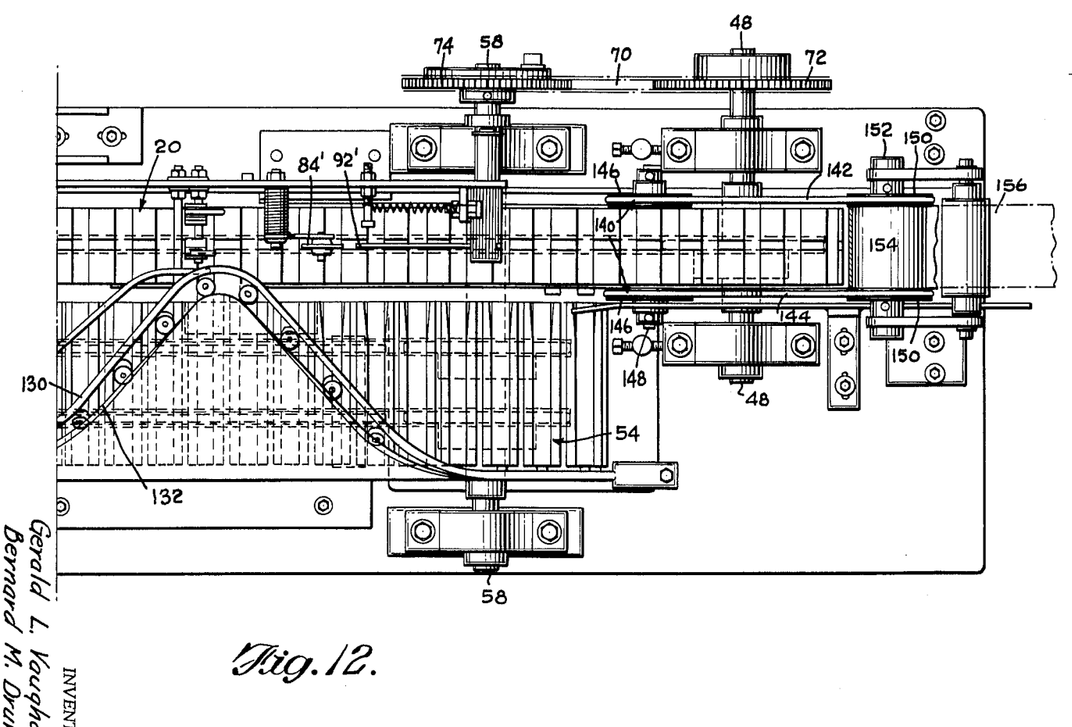

As best seen in Fig. 5, main drive motor 64 is mounted on a tilting base member 76 which is pivotally movable with respect to the stationary framework of the apparatus about pivot point 77 by means of handle member 78 to thereby vary the speed of the drive belt 65 connecting motor 64 to variable speed transmission 66. To control the tension of chain 70 which drives sprockets 72 and 74, a sprocket 80 is supported for rotation by an arm member 82. Arm member 82 is provided with a slot which permits the arm to be slidably moved along a bolt member carried by the stationary framework of the machine in such manner as to permit the position of sprocket 80 to be adjusted to control the tension of chain 70.

In order to drive the eccentric 44 which vibrates lower wall portion 36 of hopper 10, as previously described, a large sprocket 71 is mounted on idler shaft 52 of main conveyor 20. Sprocket 71 is connected through chain 73 to a small sprocket 75 on countershaft 87. A large sprocket 79 carried by countershaft 87 is connected through chain 81 to a sprocket 83 mounted on shaft 45 which carries eccentric 44. An adjustable tensioning sprocket 85 may be employed to adjust the tension on chain 81. Eccentric 44 is driven at a high rate of speed by the transmission system just described to thereby impart a rapid vibratory movement to the lower wall portion 36 of hopper 10.

Right-side-up orientation

When the wood members are discharged from the lower wall portion 36 of hopper 10, they drop into pockets 24 of flights 22 of main conveyor 20 in parallel relation to each other and to the pockets 24 of the conveyor but randomly oriented with respect to the side which faces upwardly and also with respect to the way in which the ends of the woods are directed.

In order to obtain right-side-up orientation of the wood members, namely, in order to have the notched side of the wood members facing upwardly, a "right-side-up" orientation station, generally indicated at 69, is positioned a short distance beyond the discharge end of the hopper. This station includes a narrow disc-like roller member 84 supported for rotation at the lower end of an arm 86 which is pivoted at point 88 rearwardly of and above roller member 84. A spring member 90 biases arm 86 downwardly toward main conveyor 20 and thus toward the wood members carried by conveyor 20. Roller member 84 is positioned centrally of the transverse width of the conveyor flights 22 so as to overlie the centrally located notch of the wood members.

Figures 1, 8, 17, 18:
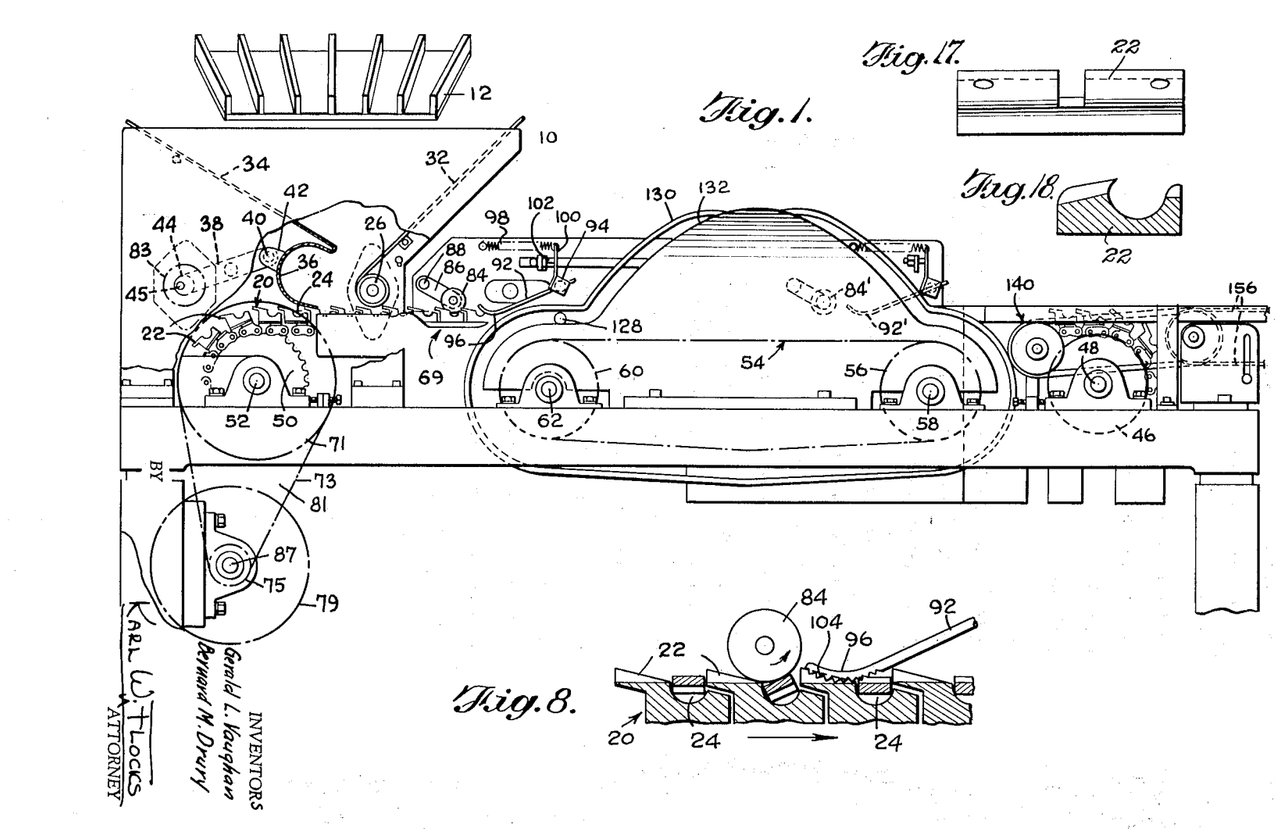
Fig. 1 is a front elevation view of the spring-pin woods feeding and orienting machine in accordance with the invention.
Fig. 8 is an enlarged fragmentary detail partly in section showing the wood members being rotated to correct side orientation.
Figs. 17–18 are detail views showing a modified form of wood pin conveyor flight.
Figure 2:
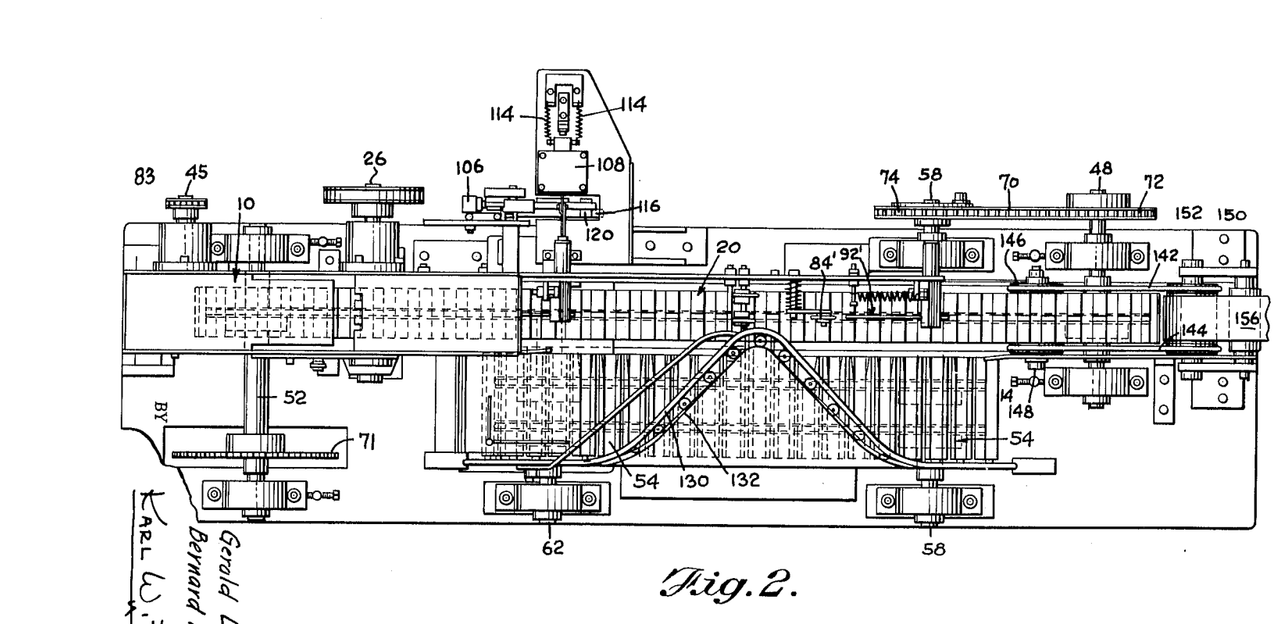
Fig. 2 is a top plan view of the machine of Fig. 1.
Figure 3:
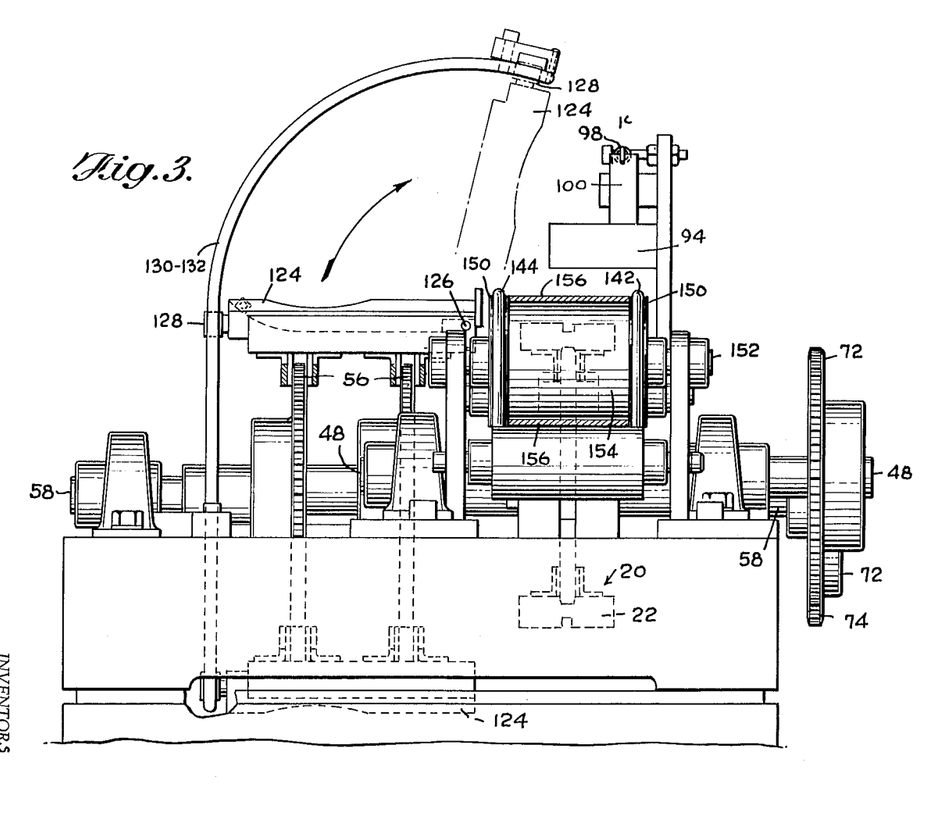
Fig. 3 is a right-hand end view of the machine of Fig. 1.
Figure 4:
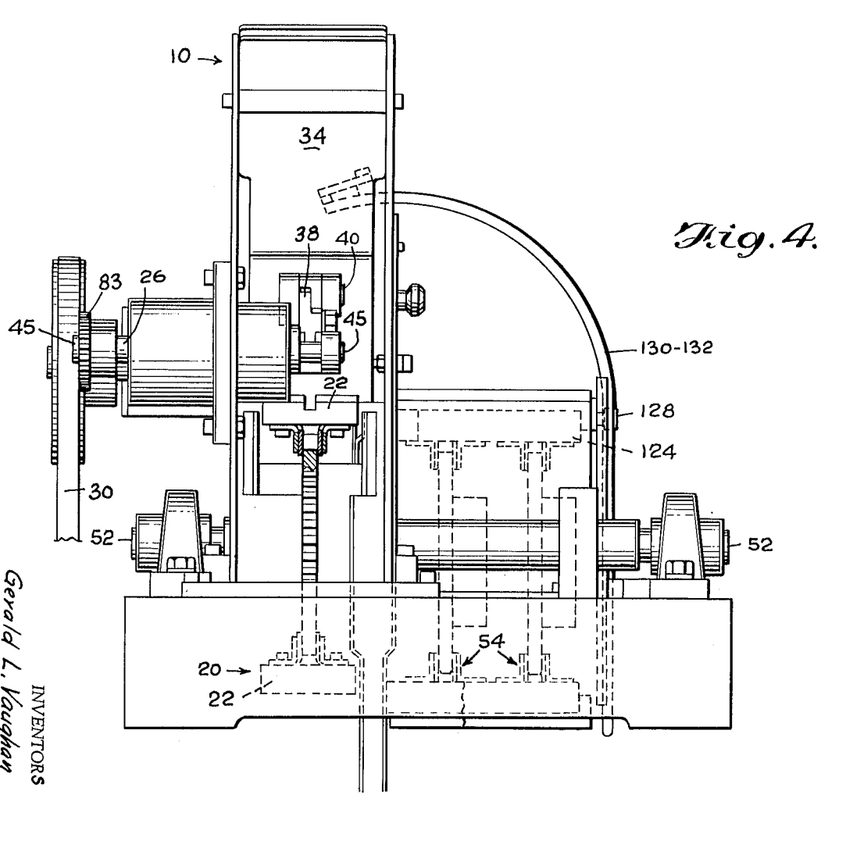
Fig. 4 is a left-hand view of the machine of Fig. 1.

As best seen in Fig. 8, when a wood member having its notched face directed upwardly is positioned in a pocket 24 of a main conveyor flight 22, and thus is properly oriented with respect to the side which faces upwardly, roller 84 passes through the notch and has no effect on the orientation of the wood member. However, if the wood member is positioned in pocket 24 with its notched face downwardly, the pressure of roller 84 on the upwardly disposed unnotched face of the wood member, combined with the forward movement of the conveyor, exerts a turning movement which causes the wood member to turn approximately 45 degrees in a counterclockwise direction about is longitudinal axis while roller 84 engages the upper face of the wood member.

Cooperating with roller 84 which initiates the turning movement of a wood member having wrong-side-up orientation as just described, is a second arm member 92 which is pivotally supported at point 94, arm 92 extending rearwardly of its pivotal support with respect to the direction of movement of conveyor 20 and terminating in a curved end portion 96 disposed a slight distance forwardly of roller 84 with respect to the direction of movement of the conveyor. The spacing between roller 84 and end portion 96 of arm 92 is such that the end portion 96 of arm 92 becomes in overlying relation to the forward edge of a wood member slightly in advance of the moment when roller 84 passes out of overlying relation to the same wood member.

A spring 98 connected to an extension 100 on arm 92 biases arm 92 downwardly toward conveyor 20 and the wood members carried thereby. An adjustable stop member 102 limits the downward movement of arm 92.

The underneath surface of the curved forward end 96 of arm 92 is serrated as indicated at 104. The serrations of arm 92 engage the leading edge of a wood member having a wrong-side-up orientation which has been initially partially turned by roller 84, as previously explained. Since the wrongly-oriented wood member is in the meantime being carried forwardly by main conveyor 20, the result of the engagement of the leading edge of the wood member by the serrated end of arm 92 is that the partially turned wood member is completely rotated until the notched face of the wood member is right side up. With its notched face directed upwardly, the wood member then passes the serrated arm 92, the curved end portion 96 of the arm passing through the notch of the wood member.

Right end orientation

After the wood members pass the right-side-up orientation station, the wood members are then all oriented with their right side up, that is, with the notched face of the wood members directed upwardly, and are in parallel relation to each other, but are randomly oriented with respect to the direction in which the ends of the wood members point. It is necessary for the ultimate assembly of the wood members into spring clothes-pins that all of the wood members have their corresponding ends pointing in the same direction. The apparatus herein described arranges the wood members so that the thin or tapered end of each wood member points away from the auxiliary conveyor 54. In order to provide the proper end orientation of the wood members, an apparatus is provided which will now be described.

In order to detect the wrong-end-orientation of the wood members, a microswitch 106 has a sensing member 107 which is positioned in overlying relation to the main conveyor 20 adjacent the edge disposed away from auxiliary conveyor 54 at a height such that the microswitch is actuated when a wood member having the wrong end orientation passes beneath it. That is, a wood member whose thick end is disposed toward the rear of the machine (the side away from auxiliary conveyor 54) moves microswitch 106 to actuated position, whereas a wood member whose thin end passes beneath the microswitch sensing means does not actuate microswitch 106.

Microswitch 106 is connected in series with solenoid 108 of a wood-ejecting mechanism generally indicated at 110. Wood-ejecting mechanism 110 includes a plunger member 112 which is biased by springs 114 to non-ejecting position. The sensing finger 107 of microswitch 106 is so positioned and adjusted that it senses the end orientation of the wood members, the axis of which lies in that plane extending transversely of the path of movement of conveyor 20 in which the axis of plunger 112 of the wood ejecting mechanism lies.

When solenoid 108 is energized due to the detection by sensing means 107 of a wood member having wrong end orientation, plunger 112 is moved against the force of springs 114 into engagement with the wood member having the wrong end orientation. Plunger 112 ejects the wood member from the pocket 24 of main conveyor flight 22 and into an aligned pocket of auxiliary conveyor 54 which moves side-by-side with main conveyor 20 in synchronized relation therewith.

In order to insure that solenoid 108 can be energized only when a flight of main conveyor 20 is properly aligned with the plunger 112 of wood ejecting mechanism 110, and is not energized while the flights of the conveyor are moving into aligned position with respect to the wood ejecting mechanism, a rotary cam member 116 (Fig. 5) is mounted on idler shaft 62 of auxiliary conveyor 54. A pivoted lever member 118 mounted adjacent cam member 116 has a cam follower 120 which rides on cam 116 and opens and closes the series circuit which includes solenoid 108 and microswitch 106 in synchronism with movement of conveyors 20 and 54 in such manner that solenoid 106 can be energized only when a flight 22 of main conveyor 20 is properly aligned with plunger 112 of wood ejecting mechanism 110.

Auxiliary conveyor 54 includes a plurality of pocketed flight members 124 each of which is pivotally supported as at 126 with respect to the auxiliary conveyor adjacent the lateral edge of the auxiliary conveyor facing main conveyor 20. The opposite end of each of the pivotally mounted flights of the auxiliary conveyor carries a cam follower 128 which rides during the entire movement of flight members 124 between a pair of cam tracks 130 and 132 which extend in an endless path above the upper run of auxiliary conveyor 54 and also beneath the lower run of the conveyor. Thus flight members 124 are guided for movement during their passage along both upper and lower runs of the auxiliary conveyor. The path of cam tracks 130 and 132 is such that the flight members 124 of the auxiliary conveyor lie in the same horizontal plane as the flights of the main conveyor adjacent the wood ejecting station 110 whereby a wood member ejected from a flight 22 of the main conveyor can move directly into the pocket of an aligned flight on the auxiliary conveyor.

Immediately following the wood ejecting station in the direction of travel of the conveyors, cam tracks 130 and 132 move vertically upwardly and laterally across the upper run of the auxiliary conveyor toward main conveyor 20 to cause the pivotally supported flight members 124 to move from a horizontal to a vertical position and then slightly beyond a vertical position to cause a wrong-end-oriented wood member carried by any one of the flights of the auxiliary conveyor to be correspondingly moved to a position beyond the vertical in which it tips over and falls back into the same flight of main conveyor 20 as that in which it was originally positioned before being ejected.

Since the wood members sometimes fall back into the pockets of main conveyor 20 from auxiliary conveyor 54 with their notched faces downwardly, it is necessary to provide a second right-side-up orientation station along the path of the main conveyor beyond the point at which the auxiliary conveyor discharges the wood members back into the pocketed flights of the main conveyor.

The second right-side-up orientation station is generally indicated at 121 and is identical with the first station 69 for that purpose previously described in that it includes a pivoted spring-biased roller member 84' which partially rotates woods having wrong-side orientation, and a spring-biased arm member 92' having an end portion which is serrated and which completes the turning of a wood member having wrong side orientation. The details of the two turning members 84' and 92' will not be described since they are identical with the similar members 84 and 92 at the first right-side-up orientation station 69 previously described.

In order to receive the wood members which are being discharged from main conveyor 20, a pick-up conveyor generally indicated at 140 is provided adjacent the end of the upper run of main conveyor 20. Pick-up conveyor 140 includes two pick-up belts 142 and 144 positioned adjacent the opposite edges of main conveyor 20. Conveyor belts 142 and 144 pass at one end around idler pulleys 146 carried by an idler shaft 148 and at their opposite end around pulleys 150 carried by shaft 152. A drum member 154 is attached to shaft 152 and a conveyor belt 156 driven from some exterior point not shown on the drawings passes around drum 154 to rotate shaft 152 and consequently serve as a source of driving power for pick-up conveyor 140. Wood members pass from the discharge end of main conveyor 20 onto pick-up conveyor 140, and are passed by pick-up conveyor 140 to conveyor belt 156 which carries them to some desired destination.

*Summary of operation*

In the operation of the spring pin woods feeder apparatus hereinbefore described, the randomly oriented wood members are delivered from an external source to the chutes 12 which deliver the wood members to the open upper end of hopper 10, chutes 12 serving to arrange the wood members in parallel relation to each other as they fall into the hopper. The woods are delivered from the lower end of hopper 10 into the semi-circular pockets 24 of flights 22 of main conveyor 20. The wood members within the hopper are kept in a fluid condition for feeding to 20 by roller member 26 positioned adjacent the lower end of hopper 10. Roller member 26 also aids in delivering the wood members in parallel relation to flights 22 of conveyor 20. Roller 26 is driven from a separate drive motor 28 through a V-belt drive 30.

In order to further assist in the feeding of the wood members from hopper 10 to conveyor 20, end wall portion 36 of the hopper is vibrated by the arm member 38 driven by eccentric 44. Eccentric 44 is driven from idler shaft 52 of main conveyor 20 through sprockets 71, 75, 79 and 83.

Main conveyor 20 is driven by main drive motor 64, through drive belt 65, variable speed transmission device 66, chain member 70 and drive sprocket 72. Chain member 70 also drive auxiliary conveyor 54 synchronously with main conveyor 20 through sprocket 74.

Wood members discharged from the lower end of hopper 10 into the pockets 24 of main conveyor 20 are randomly oriented with respect to the side which is upwardly disposed and also with respect to the direction in which the ends of the wood members are pointed. In order to properly orient the sides of the wood members so that the notched sides thereof are facing upwardly, the wood members are carried by conveyor 20 past a right-side-up orientation station 69 which includes a disk-like spring-biased roller member 84 and a pivoted arm member 92. Roller 84 passes through the centrally located notch of a wood member whose notched side is upwardly disposed and has no effect on such wood members. However, a wood member whose notched face is disposed downwardly is rotated approximately 45 degrees in a counterclockwise direction due to the turning movement produced by the combined effect of the pressure of roller 84 and the forward movement of main conveyor 20. The wood member which has been partially turned by roller 84 is then engaged by the serrated edge of pivoted arm member 92 which completes the turning of the wood member having wrong side orientation so that its notched face is disposed upwardly.

The wood members, now all arranged with their notched sides upwardly, pass by a wood ejecting mechanism 110 including a plunger 112 which is normally spring-biased to non-ejecting position but which is actuated into wood ejecting position when solenoid 108 is energized by the actuation of microswitch 106. The sensing element 107 of microswitch 106 detects the thick end of a wood member having wrong-end orientation to thereby actuate the microswitch. When plunger 112 is moved to ejecting position by the energization of solenoid 108, it ejects the wood member having wrong-end orientation from pocketed flight 22 of main conveyor 20 into flight member 124 of auxiliary conveyor 54. The flight members 124 of the auxiliary conveyor are pivoted at their end adjacent main conveyor 20 and have a cam follower 128 on their opposite end which cooperates with cam tracks 130 and 132 to move the pivoted flight members 124 from the horizontal position in which they receive the wood members from main conveyor 20 to slightly beyond a vertical position in which they discharge or flip the wood members back into the same flight members 22 of main conveyor 20 as that in which they were originally positioned. In flipping the wood members back into their original flight members on the main conveyor, the ends of the wood members are reversed from their original improper position.

Main conveyor 20 then carries the wood members, now having their ends properly oriented, past a second right-side-up orientation station 121 which reorients the sides of any wood members which may have been discharged from auxiliary conveyor 54 with their notched sides facing downwardly. The wood members are then delivered by main conveyor 20 to conveyor belts 142 and 144 of pick-up conveyor 140 which straddle main conveyor 20 on either side thereof. Pick-up conveyor 140 then delivers the wood members to delivery conveyor 156 which passes around drum 154 mounted on drive shaft 152 of pick-up conveyor 140.

Modified end orientation apparatus

There is shown in Figs. 13–16 a modified apparatus for obtaining proper end orientation of the wood members. This modified apparatus may be substituted in place of the auxiliary conveyor 54 having the pivotally mounted flights 124 which cooperate with the cam tracks 130 and 132 as described in connection with the embodiment of Figs. 1–12, inclusive.

Figure 13:
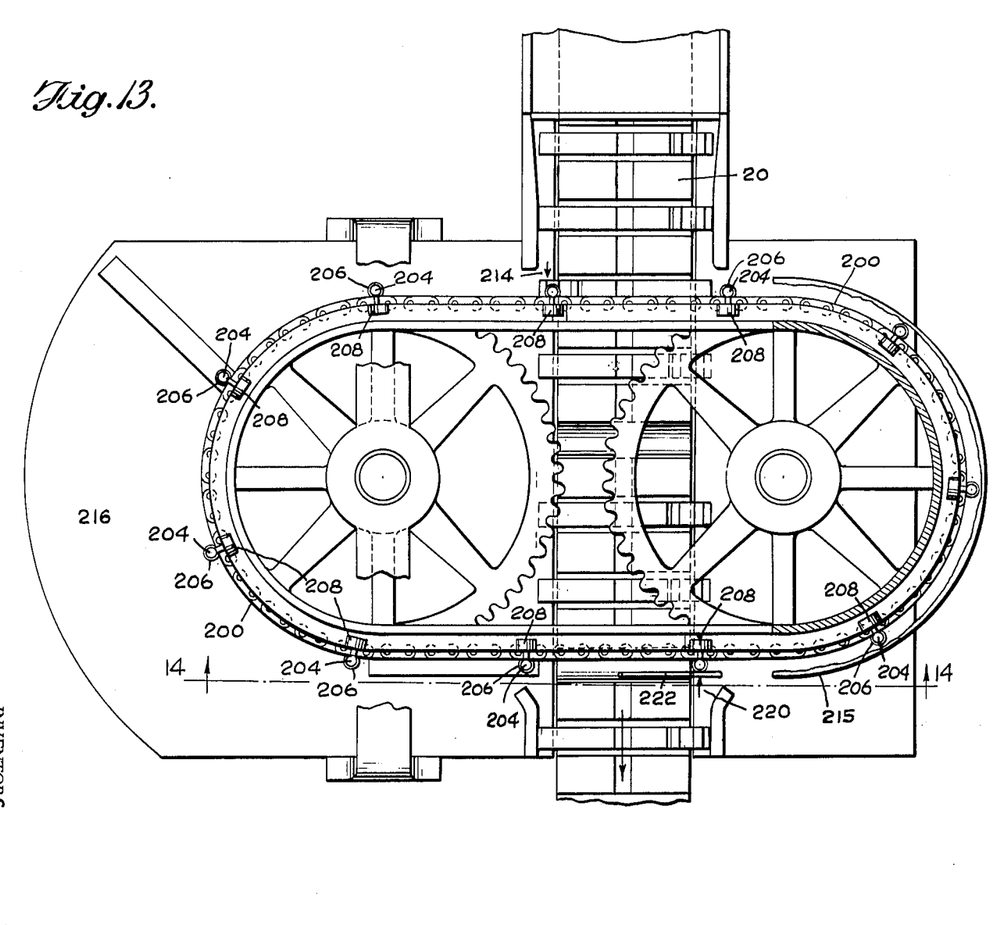
Fig. 13 is a plan view of a modified form of end orientation apparatus.
Figures 14, 15, 16:
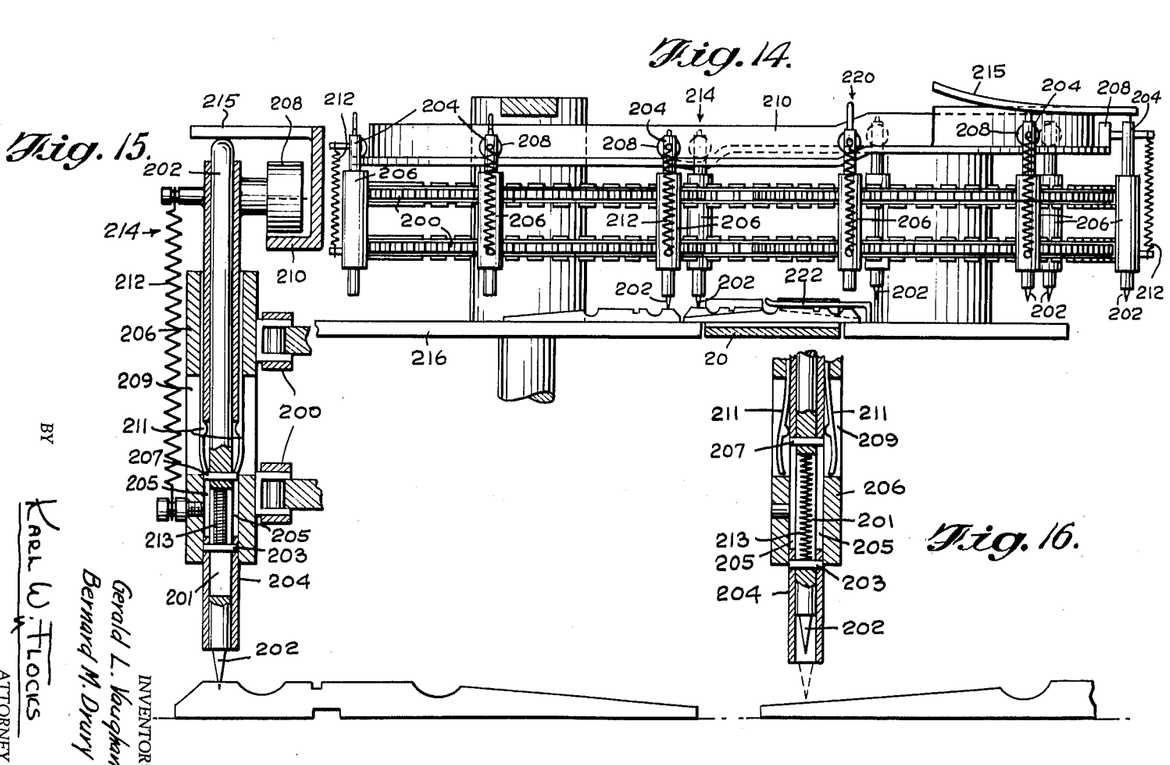
Fig. 14 is a view taken along line 14—14 of Fig. 13 and looking in the direction of the arrows.
Fig. 15 is a vertical sectional view of one of the sharp pin members and its associated parts.
Fig. 16 is a fragmentary view similar to Fig. 15 showing the parts in another position.

The modified end orientation apparatus includes an auxiliary conveyor member 200 which moves in a horizontal plane along a path which extend at right angles to the line of travel of main conveyor 20 for most of its length except at the ends of the path of travel of the auxiliary conveyor.

Auxiliary conveyor 200 of the modified apparatus includes a plurality of sharp pin members 202 carried by shank members 204 which are slidably movable in a vertical direction in supporting sleeve members 206 carried by auxiliary conveyor 200. Each of the pin supporting shank members 204 has fixed thereto a cam follower 208 which rides along a stationary cam track 210 extending around the entire path of travel of the auxiliary conveyor. Each shank member 204 and the sharp pin member 202 carried thereby is biased downwardly into engagement with stationary cam track 210 by a spring member 212 so that the vertical position of pin member 202 is controlled at all times by the height of the cam track.

The auxiliary conveyor 200 overlies and laterally crosses the path of movement of main conveyor 20 in two transverse planes spaced longitudinally along the conveyor. In one of these crossings, namely, that nearest the right-side-up orientation station and indicated at 214, the auxiliary conveyor picks up wood members having wrong end orientation, and in the second crossing, namely, that farthest along the path of movement of main conveyor 20 and indicated at 220, the auxiliary conveyor discharges the wood members back into the same flights of the main conveyor as those from which they were removed.

The height of cam track 210 in the region of the first crossing of the auxiliary conveyor, indicated at 214, is such that the spring-biased pin members 202 are moved downwardly with considerable force by their respective springs 212. The height to which each pin 202 is permitted to drop and the timing of conveyors 20 and 200 are such that the end of the pin member 202 engages a wood member whose thick end is positioned adjacent the rear side of the main conveyor, but does not engage a wood member whose thin end is positioned adjacent the rear side of the main conveyor.

A wood member having wrong end orientation thus becomes attached to one of the sharp pin members 202 and is carried by the pin member along the path of movement of auxiliary conveyor 200. The wood member is supported during its movement by a suitable horizontal support surface 216, and suitable guide surfaces 218 are provided to maintain the longitudinal axis of the pin always in parallel relation to the path of movement of the conveyor throughout its entire route. The wood member is thus carried through a path of movement of 180 degrees of the total movement of auxiliary conveyor 200 by the time the auxiliary conveyor reaches the region of its second crossing of the main conveyor, as indicated at 220.

Stationary cam track 210 along the path of auxiliary conveyor 200 is so constructed in the region of the second crossing 220 that shank member 204 and the sharp pin 202 carried thereby are raised upwardly by the cam track against the force of spring 212 to thereby remove the pin from the wood member, when the wood member attached to pin 202 is in overlying position with respect to main conveyor 20. Suitable hold-down means 222 are provided to hold the wood member down while pin 202 is being pulled therefrom by the action of cam track 210. The timing of auxiliary conveyor 200 is so related to that of main conveyor 20 that the wood member arrives back over the main conveyor 20 just as the pocketed flight of the main conveyor which originally held the wrong-end-oriented wood member arrives beneath auxiliary conveyor 200, so that the wood member is dropped back into the same pocketed flight of the main conveyor as that from which it was originally removed. Due to the 180 degrees through which the wrong-end-oriented wood member has been carried by auxiliary conveyor 200, its end is properly oriented when it is dropped back into the pocketed flight of the main conveyor from which it was removed.

It can be seen from the foregoing that there is provided in accordance with this invention an apparatus having great utility in connection with the manufacture and assembly of spring-type clothespins. The apparatus provides a rapid and efficient means for properly orienting the wood members of the spring-type clothespins so that they are all parallel to each other, have their same sides facing upwardly, and all have their corresponding ends pointed in the same direction. This apparatus greatly expedites and facilitates the assembly operation of the spring-type clothespins and results in an economic saving in the manufacturing process.

As illustrated in Figs. 15 and 16, the sharp pin members 202 are carried by the tubular shank members 204. The pin members 202 are formed with slots 201 across which extend pins 203 carried by shank members 204 which are slotted at 205. Pins 207, which extend transversly through sharp pin members 202, have projecting ends which travel in guided relation in slots 205 in shank members 204. Encompassing a portion of shank members 204 is the supporting sleeve 206 provided with slots 209 to provide for movement of spring locking dogs 211 (compare Fig. 15 with Fig. 16) which have their upper ends secured to sleeve 206. The spring 213 urges upward movement of sharp pin members 202 when the locking dogs 211 are released as shown in Fig. 16 and this release occurs when the point of sharp pin members 202 has traveled downwardly beyond the position permitted by a clothespin element in the arrangement shown in Fig. 15 and as indicated in dotted lines in Fig. 16 The cam 215 is arranged as to reset sharp pin members 202 which have been released by locking dogs 211 so that they are ready for operation as above described.

It will be obvious to those skilled in the art that various changes may be made without departing from the spirit of the invention and, therefore, the invention is not limited to what is shown in the drawings and described in the specification but only as indicated in the appended claims.

What is claimed as the invention is:

1. An apparatus for orienting wood members for spring-type clothespins comprising a horizontally moving main conveyor means including means for receiving the wood members, an auxiliary conveyor means extending in a horizontal path at right angles to the path of said main conveyor means, said auxiliary conveyor means including oppositely disposed runs which each respectively cross the path of said main conveyor means, means for transferring wood members having improper end orientation onto said auxiliary conveyor means as it crosses the path of said main conveyor means on one of its runs, and means for transferring wood members from said auxiliary conveyor means back to said main conveyor means as the other run of said auxiliary conveyor means crosses said main conveyor means, said auxiliary conveyor means moving wood members carried thereby through a path of 180 degrees to reverse the end orientation of said wood members.

2. An apparatus as defined in claim 1, further characterized by said means for transferring wood members including vertically movable pin members carried by said auxiliary conveyor means.

3. An apparatus as defined in claim 1, further including vertically movable pin members carried by said auxiliary conveyor means, and a cam track extending along the path of movement of said auxiliary conveyor means to control the vertical position of said pin members.

4. An apparatus as defined in claim 1 including vertically movable pin members carried by said auxiliary conveyor means, a cam track extending along the path of movement of said auxiliary conveyor means to control the vertical position of said pin members, cam follower means connected to said pin members, and spring means maintaining said cam follower means engaged with said cam track.

5. An apparatus for orienting wood members for spring-type clothespins comprising a main conveyor means including means for receiving the wood members, detecting means disposed along the path of said main conveyor means for detecting wood members having their ends directed oppositely to the proper end orientation of said wood members, an auxiliary conveyor means, means actuated by said detecting means to transfer wood members having improper end orientation onto said auxiliary conveyor means, and means cooperating with said auxiliary conveyor means to properly orient the ends of wood members transferred to said auxiliary conveyor means, said auxiliary conveyor means including a plurality of holding elements supported along an edge of said auxiliary conveyor means adjacent said main conveyor means whereby wood members carried by said holding elements are moved back onto said main conveyor means.

6. An apparatus for orienting wood members for spring-type clothespins comprising a main conveyor means including means for receiving the wood members, detecting means disposed along the path of said main conveyor means for detecting wood members having their ends directed oppositely to the proper end orientation of said wood members, an auxiliary conveyor means, means actuated by said detecting means to transfer wood members having improper end orientation onto said auxiliary conveyor means, and means cooperating with said auxiliary conveyor means to properly orient the ends of wood members transferred to said auxiliary conveyor means, said auxiliary conveyor means cooperating in timed relation to said main conveyor means whereby wood members return to the same space on said main conveyor means previously occupied by them before their transfer to said auxiliary conveyor means.

References Cited in the file of this patent

UNITED STATES PATENTS

| | | |
|---|---|---|
| 1,984,962 | Brunn | Dec. 18, 1934 |
| 2,790,532 | Albertoli | Apr. 30, 1957 |
| 2,843,254 | Vaughn | July 15, 1958 |
| 2,877,884 | Esenwein | Mar. 17, 1959 |
| 2,919,011 | Tocher | Dec. 29, 1959 |

FOREIGN PATENTS

| | | |
|---|---|---|
| 675,556 | Great Britain | July 16, 1952 |